(No Model.)
F. K. COLLIER.
TIRE UPSETTER.
No. 250,324. Patented Nov. 29, 1881.
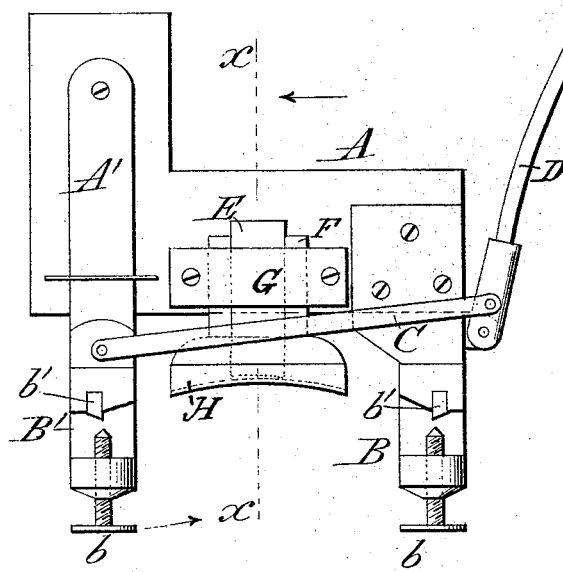
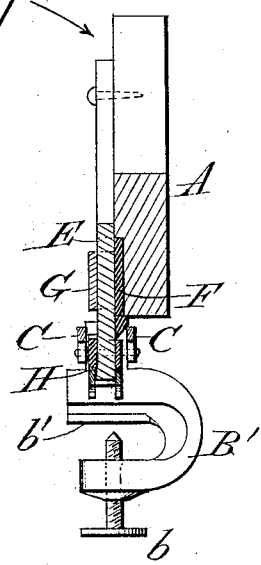
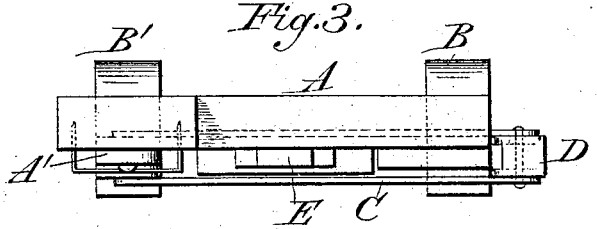
Attest:
F. H. Schott.
A. R. Brown.
Inventor:
Fred. K. Collier
C. H. Watson & Co. atty

UNITED STATES PATENT OFFICE.

FRED. K. COLLIER, OF LITCHFIELD, MICHIGAN, ASSIGNOR OF ONE-HALF TO NELSON TURRELL, OF SAME PLACE.

TIRE-UPSETTER.

SPECIFICATION forming part of Letters Patent No. 250,324, dated November 29, 1881.

Application filed July 7, 1881. (No model.)

*To all whom it may concern:*

Be it known that I, FRED. K. COLLIER, of Litchfield, in the county of Hillsdale and State of Michigan, have invented certain new and useful Improvements in Tire-Shrinkers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to machines for upsetting tires; and it consists in the construction and arrangement of parts, as hereinafter more fully described and claimed.

In the annexed drawings, Figure 1 is a side view. Fig. 2 is a section on the line $x$ $x$, and Fig. 3 is an under view.

Like letters indicate like parts.

A represents a frame or block, at one end of which is secured the fixed clamp B. At the opposite end of the block A is pivoted an oscillating arm, A', which carries the movable clamp B'. These clamps are provided with thumb-screws $b$ $b$ and bevel-bearings $b'$ $b'$ for holding the tire. The movable or oscillating clamp B' is connected by rods C C with the lever D pivoted to a lug at the outer side of the fixed clamp, and by means of which the clamp B' is caused to approach the clamp B in shrinking the tire.

Between the clamps B B' is an anvil-stem, E, which is held in place within a recess in the frame A by means of the grooved and shouldered anvil-socket F and strap G.

To the anvil-stem E is keyed a detachable anvil, H, which may be of any desired form to correspond with the dimensions of the tire.

The operation of the device will be readily understood. When the heated tire is placed in position and secured by the screws $b$ $b$ it may be shortened at the desired point by applying suitable power to the lever D, which acts through the rods C C to cause the movable clamp B' to approach the fixed clamp B.

Having thus described my invention, what I claim as new, and desire to secure by Letters Patent, is—

In a tire-upsetter, the combination, with the frame A, having a fixed clamp, B, and an oscillating arm, A', carrying a movable clamp, B', adapted to be operated by rods C C and lever D, of the anvil-stem E, having detachable anvil H, shouldered socket F, and strap G, all substantially as and for the purpose described.

In testimony that I claim the foregoing as my own I have hereto affixed my signature in presence of two witnesses.

FRED. K. COLLIER.

Witnesses:
H. N. TURRELL,
H. C. ACKLEY.